United States Patent
Manley

(10) Patent No.: US 7,581,568 B2
(45) Date of Patent: Sep. 1, 2009

(54) WATER JET WOVEN AIR BAG FABRIC MADE FROM SIZED YARNS

(75) Inventor: Scott Manley, Gray Court, SC (US)

(73) Assignee: International Textile Group, Inc., Greensboro, NC (US)

( * ) Notice: Subject to any disclaimer, the term of this patent is extended or adjusted under 35 U.S.C. 154(b) by 768 days.

(21) Appl. No.: 11/349,052

(22) Filed: Feb. 7, 2006

(65) Prior Publication Data

US 2007/0184733 A1 Aug. 9, 2007

(51) Int. Cl.
*D03D 15/08* (2006.01)

(52) U.S. Cl. .................. 139/386; 442/187

(58) Field of Classification Search ........... 442/187; 139/36, 383 R, 386, 387 R, 389, 390, 420 R
See application file for complete search history.

(56) References Cited

U.S. PATENT DOCUMENTS

| | | |
|---|---|---|
| 3,799,574 A | 3/1974 | Bonn et al. |
| 3,814,141 A | 6/1974 | Iribe et al. |
| 4,015,317 A | 4/1977 | Johnsen |
| 4,082,508 A | 4/1978 | Marshall |
| 4,096,890 A | 6/1978 | Kusakabe et al. |
| 4,121,626 A | 10/1978 | Brown et al. |
| 4,287,608 A | 9/1981 | Meyer |
| 4,446,893 A | 5/1984 | Gunneman et al. |
| 4,668,578 A | 5/1987 | Luxon |
| 4,751,258 A | 6/1988 | Minami |
| 4,788,084 A | 11/1988 | Morin |
| 4,921,735 A | 5/1990 | Bloch |
| 4,968,776 A | 11/1990 | Fujita et al. |
| 4,975,262 A | 12/1990 | Suto et al. |
| 4,977,016 A | 12/1990 | Thornton et al. |
| 5,010,663 A | 4/1991 | Thornton et al. |
| 5,011,183 A | 4/1991 | Thornton et al. |
| 5,073,418 A | 12/1991 | Thornton et al. |
| 5,093,163 A | 3/1992 | Krummheuer et al. |
| 5,106,656 A | 4/1992 | Nakaoka et al. |
| 5,110,666 A | 5/1992 | Menzel et al. |
| 5,178,408 A | 1/1993 | Barrenscheen et al. |
| 5,206,078 A | 4/1993 | Inoguchi et al. |
| 5,222,932 A | 6/1993 | Fontecchio |
| 5,236,775 A | 8/1993 | Swoboda et al. |
| 5,236,777 A | 8/1993 | Inoguchi et al. |
| 5,256,343 A | 10/1993 | Suto et al. |
| 5,259,645 A | 11/1993 | Hirabayashi et al. |
| 5,277,230 A | 1/1994 | Sollars, Jr. |
| 5,277,966 A | 1/1994 | Nakayama et al. |
| 5,296,278 A | 3/1994 | Nishimura et al. |
| 5,356,680 A | 10/1994 | Krummheuer et al. |
| 5,421,378 A | 6/1995 | Bowers et al. |
| 5,441,798 A | 8/1995 | Nishimura et al. |
| 5,474,836 A | 12/1995 | Nishimura et al. |
| 5,477,890 A | 12/1995 | Krummheuer et al. |
| 5,503,197 A | 4/1996 | Bower et al. |
| 5,508,073 A | 4/1996 | Krummheuer et al. |
| 5,540,965 A | 7/1996 | Nishimura et al. |
| 5,554,424 A | 9/1996 | Krummheuer et al. |
| 5,612,124 A | 3/1997 | Krummheuer et al. |
| 5,630,261 A | 5/1997 | Beasley, Jr. |
| 5,650,207 A | 7/1997 | Crouch |
| 5,902,672 A | 5/1999 | Swoboda et al. |
| 6,099,963 A | 8/2000 | Medeiros et al. |
| 6,182,709 B1 | 2/2001 | Konishi et al. |
| 6,306,462 B1 | 10/2001 | Beasley, Jr. |
| 6,413,452 B1 | 7/2002 | Medeiros et al. |
| 6,495,204 B1 | 12/2002 | Allen et al. |
| 6,601,614 B1 | 8/2003 | Ishii |
| 6,623,686 B1 | 9/2003 | Janikowski et al. |
| 6,652,654 B1 | 11/2003 | Propp et al. |
| 6,673,728 B1 | 1/2004 | Newbill |
| 6,713,412 B2 | 3/2004 | Newbill |
| 6,796,337 B2 | 9/2004 | Medeiros et al. |
| 6,962,731 B2 | 11/2005 | Propp et al. |

FOREIGN PATENT DOCUMENTS

| | | |
|---|---|---|
| CA | 2061810 | 8/1992 |
| GB | 2199261 | 7/1988 |

OTHER PUBLICATIONS

Product Information on Katamin BW (west paraffinating agent for cotton and linen yarns and mixtures with synthetic fibers; stitch lubricant for cotton knitwear) from Zschimmer & Schwarz, Inc., 2 pages.
Product Information on Carbowax® from the Dow Chemical Company, 1 page.
Technical Bulletin and Material Safety Data Sheet on Unilube 1513 from Unichem, Inc., Jun. 20, 2005, 5 pages.

*Primary Examiner*—Arti Singh-Pandey
(74) *Attorney, Agent, or Firm*—Dority & Manning, P.A.

(57) ABSTRACT

An air bag material and a process for making the material are disclosed. The air bag material is formed from a water jet woven fabric containing warp yarns and weft yarns. In accordance with the present disclosure, the warp yarns are treated with a size composition prior to being woven into the fabric. The size composition improves the runnability of the yarns. Of particular advantage, the size composition does not need to be removed after the fabric is produced. In fact, leaving the size composition on the fabric has been found to significantly increase the tear strength of the fabric.

8 Claims, 4 Drawing Sheets

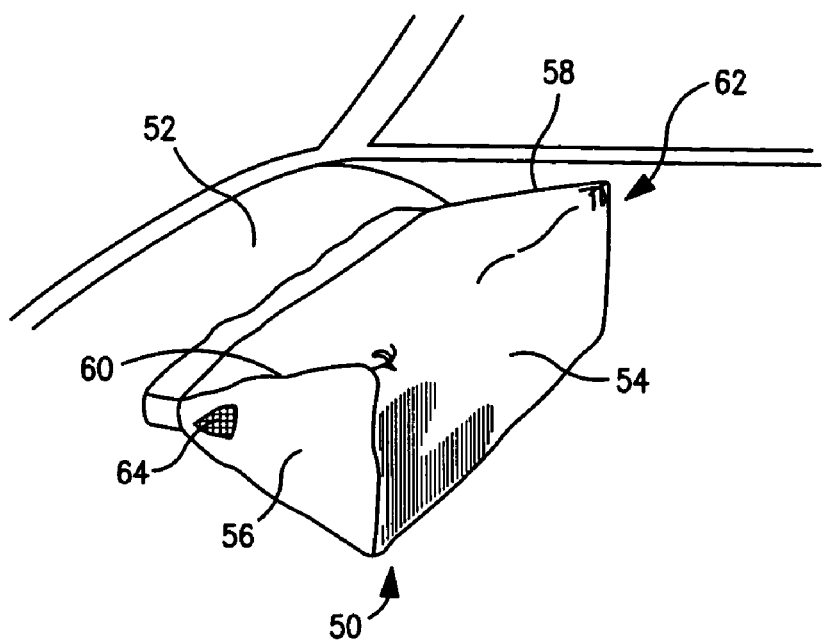
FIG. 4
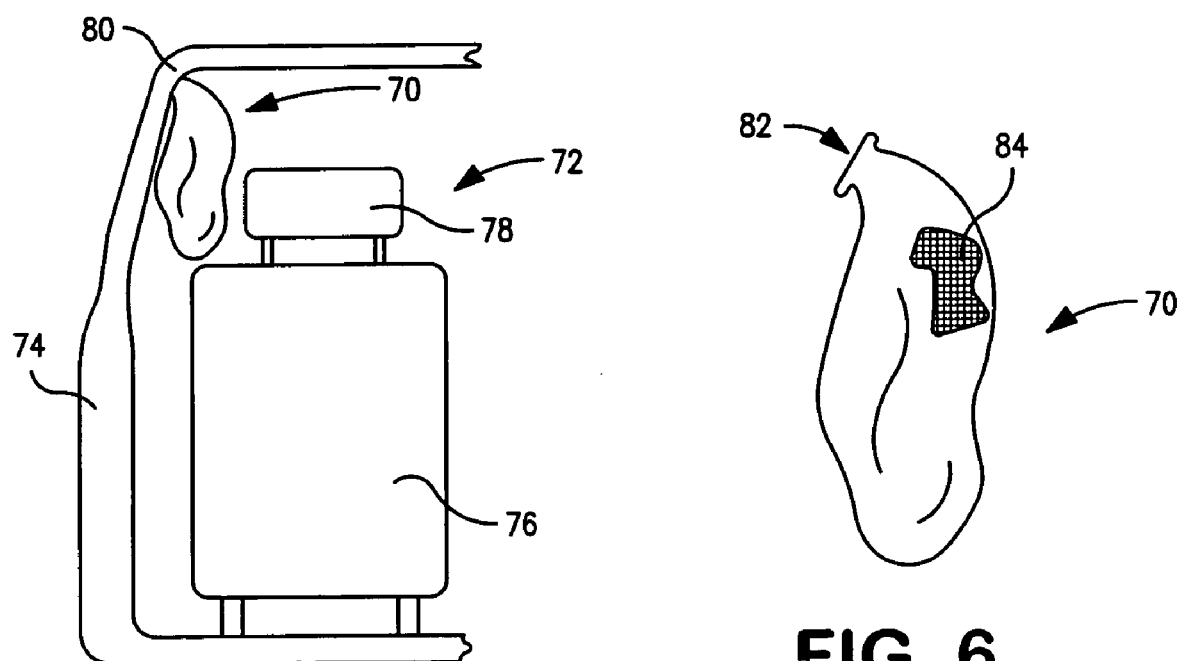
FIG. 5
FIG. 6

WATER JET WOVEN AIR BAG FABRIC MADE FROM SIZED YARNS

BACKGROUND OF THE INVENTION

The proliferation of air bag systems in vehicles has and continues to be dramatic. In the recent past, for instance, air bags were only available on certain models of cars and were typically limited to being installed in the steering column. Now, air bags are standard equipment on almost all current models of cars and trucks. Further, in addition to driver-side air bags, vehicles now contain passenger-side air bags and side-curtain air bags that may be located along the side walls of a vehicle and can, for instance, extend substantially the entire length of an interior side of a passenger compartment.

When installed in a vehicle, air bags are typically folded and located in small compartments. The air bags are placed in communication with a gas inflation system that inflates the air bag when a collision between the vehicle and another object is detected.

Air bags are made from materials, such as woven fabrics, that must have a unique combination of properties. For instance, the air bags should be capable of being folded into small shapes and should also be able to withstand broad temperature swings without degrading. For example, the inside of a vehicle can become relatively warm in the summer and relatively cold in the winter.

Air bags should also be made from materials that are capable of withstanding the force of the inflation gas while, in some embodiments, also being capable of quickly deflating after being inflated in a process referred to as "leak down". Air bag materials should also have relatively high tensile strength and tear strength and should be capable of being made with a relatively low permeability.

In the past, many air bags were made from a woven fabric containing multifilament yarns, such as yarns made from nylon. The air bag fabrics were made using various different weaving systems. For instance, in some applications, the fabrics were woven on a Rapier weaving machine.

Recently, various attempts have been made to produce air bag fabrics on water jet weaving machines. In a water jet loom, the weft or pick yarns are moved in the cross machine direction through a shed formed by the warp yarns using jet streams of water. Of particular advantage, water jet weaving machines are much faster and have a higher throughput than conventional Rapier weaving machines.

The use of water jet looms to produce air bag fabrics, for instance, is disclosed in U.S. Pat. Nos. 5,421,378; 5,503,197; 5,650,207; 6,413,452; and 6,796,337, which are all incorporated herein by reference. In the past, when producing air bag fabrics on water jet looms, it was generally taught not to apply a size to the warp yarns during the weaving process. Sizing is a procedure where the warp yarns are coated with a substance, such as a polymeric material that facilitates weaving, such as by reducing friction and/or improving abrasion resistance. The process of applying a size is commonly called "slashing". Abrasion reduction contributes to a reduction in the number of breaks, strip backs, fuzz balls, etc. all of which translate into a higher percentage of off-quality and into more machine stops during the course of weaving.

In the past, a size was not typically applied to the warp yarns during a water jet weaving process for various reasons. For instance, water jet weaving processes can be less stressful on the yarns during weaving in comparison to other conventional weaving systems. This is possible in part because the water introduced in this process acts in limited capacity as a size by adding coherency and lubrication to the yarn. Consequently, a size was generally not necessary in order to prevent yarn breakage. Further, the use of a size requires several extra steps in the fabrication process. In addition, sizes can add cost to the product and typically were removed from the yarns after being applied in a process known as "scouring".

The present disclosure is generally directed to further improvements in producing air bag fabrics on water jet weaving machines. In particular, the present disclosure is directed to the use of a size composition during water jet weaving in which the formed fabric does not necessarily have to undergo scouring to remove the size composition. Of particular advantage, the size composition not only improves the efficiency of the weaving process but can also provide benefits and advantages to the final product.

SUMMARY OF THE INVENTION

In general, the present disclosure is directed to a water jet woven air bag fabric, to a process of making the fabric, and to air bags constructed from the fabric. The air bag fabric, for instance, can be formed on a water jet weaving machine. In accordance with the present disclosure, at least the warp yarns of the fabric are treated with a size composition. The size composition and the amount of the composition used (i.e. add-on) is selected so as to improve the tear strength of the fabric without significantly adversely affecting any other properties. Further, the present inventor has discovered that the size composition need not be removed after the fabric is formed. It should be understood, however, that if desired, the fabric can be scoured after being produced.

In one embodiment, for example, the present disclosure is directed to an air bag material comprising a water jet woven fabric comprising warp yarns and weft yarns. The warp yarns and weft yarns may comprise, for example, multifilament synthetic yarns. The yarns can be made from a polyamide, a polyimide, a polyester, an acrylic polymer, a fluoropolymer, or a polyolefin, such as polyethylene, polypropylene, blends thereof and copolymers thereof.

In accordance with the present disclosure, the warp yarns contain a size composition that is present on the yarns in an amount sufficient to increase the tear strength of the resulting fabric by at least about 25% in both the warp direction and the weft direction. For example, the size composition may be present on the yarns in order to increase the tear strength of the resulting fabric by greater than about 50%, such as greater than about 75%, such as greater than about 100%, such as even greater than about 200% in both the warp and weft directions.

The actual tear strength of the air bag fabric may vary depending upon various factors including the type of yarns used to form the fabric. In one embodiment, for instance, the tear strength of the fabric, can be greater than about 250 N, such as greater than about 300 N, such as greater than about 400 N in both the warp direction and the weft direction.

In general, the fabric can have a basis weight of from about 150 gsm to about 400 gsm and can have an air permeability of less than about 90 l/min., such as less than about 10 l/min.

The denier of the warp yarns and weft yarns can vary dramatically depending upon the particular application and the desired results. In general, the denier can range from about 210 to about 840. The yarn density can also vary depending upon the denier of the yarns. The yarn density can be from about 20 yarns per inch to about 80 yarns per inch, such as from about 30 yarns per inch to about 50 yarns per inch in both the warp direction and the weft direction.

The size composition, in one embodiment, can contain a lubricant. In one embodiment, the size composition applied to the warp yarns can comprise an aqueous emulsion or dispersion containing polymer particles. For instance, the polymer particles may comprise polyethylene particles, such as medium density polyethylene and/or high density polyethylene. In general, the molecular weight of the polymer particles can be designed to cause the polymer to flash off the fabric or stay on the fabric while the fabric is heat set. In addition to the polymer particles, the size composition can also contain one or more surfactants. The surfactants can have multiple functions such as serving as an emulsifier and as a wetting agent for the yarns.

Any suitable air bag can be made from the above water jet woven fabric. When used to construct an air bag, the water jet woven fabric may be coated or uncoated. The air bag, for instance, may comprise a driver-side air bag, a passenger-side air bag, or a side-curtain air bag.

In order to produce the above described air bag fabric, the process can include the steps of first slashing a plurality of warp yarns with the size composition. After being slashed with the size composition, the warp yarns are fed into a water jet weaving process where weft yarns are woven with the warp yarns.

Of particular advantage, the size composition once applied to the warp yarns improves the runnability of the yarns. For instance, the size composition may be applied to the warp yarns in an amount sufficient to decrease stops per 100,000 picks by at least about 50%, such as at least about 100%, such as at least about 200%. For instance, in one embodiment, the amount of stops per 100,000 picks may decrease by greater than about 500%.

For example, in one embodiment, during water jet weaving, the process may experience less than about 5 stops per 100,000 picks, such as less than about 4 stops per 100,000 picks, such as less than about 3.5 stops per 100,000 picks, such as less than about 2 stops per 100,000 picks, such as even less than about 1.5 stops per 100,000 picks.

Optionally, the formed fabric can be scoured to later remove the size composition. The present inventor has discovered, however, that scouring may not be necessary. In fact, the size composition may serve to improve various properties of the fabric if left on the fabric. In general, the size composition can be present in the resulting fabric in an amount from about 0.001% by weight to about 1% by weight.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 4 is a perspective view of one embodiment of a passenger-side air bag made in accordance with the present disclosure;

FIG. 5 is a side view illustrating a partially inflated side-curtain air bag made in accordance with the present disclosure; and FIG. 6 is an isolated side view of the side-curtain air bag illustrated in FIG. 5.

Figure 1:
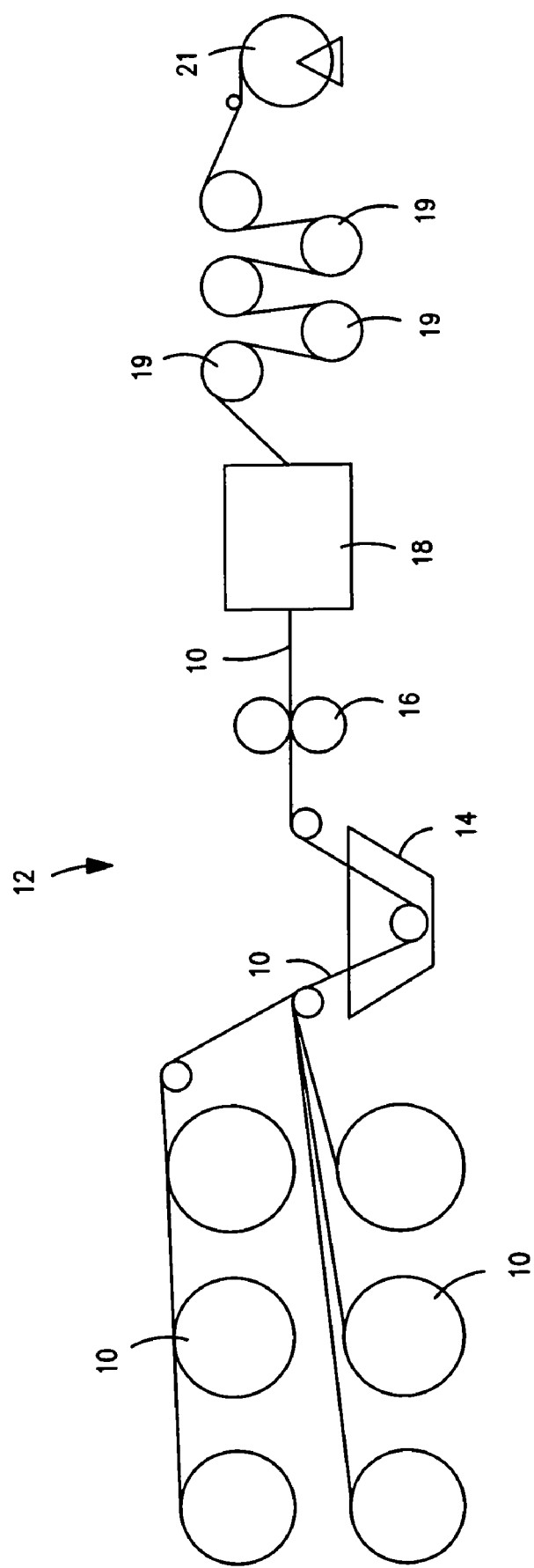
FIG. 1 is a diagrammatical view of a process for slashing warp yarns in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present invention.

In general, the present disclosure is directed to a water jet woven air bag fabric, to a process for making the fabric, and to vehicle air bags made from the fabric. The fabric can be produced, for instance, on a water jet weaving device, such as a water jet loom. Water jet weaving devices use a jet stream of water to convey the weft or pick yarns through a shed formed by the warp yarns. In accordance with the present disclosure, a size composition is applied to the warp yarns and possibly to both the warp and weft yarns in producing the fabric.

The size composition of the present disclosure provides various advantages and benefits. For instance, the size composition can increase the coherency of the yarns and improve the efficiency of the weaving process by minimizing the number of yarn breaks and other fabric imperfections. Further, in some embodiments, the size composition does not need to be removed from the yarns after the fabric is produced. In particular, the size composition can be applied in amounts that provide increased efficiency during weaving without adversely affecting any of the properties and characteristics of the fabric being produced.

In fact, in some applications, the size composition can actually serve to enhance various properties of the fabric. For example, in one embodiment, the size composition may be present on the warp yarns in an amount sufficient to increase the tear strength of the fabric. In one embodiment, a size composition can be selected that also improves the hand of the fabric and increases abrasion resistance.

In the past, many of those skilled in the art have taught against applying a size composition to the yarns of an air bag fabric when using a water jet loom. As will be discussed in greater detail below, however, the present inventor has discovered that size compositions of the present disclosure when used in conjunction with water jet weaving devices not only improve runnability but also provide various other benefits and advantages.

In general, the size composition of the present disclosure comprises an emulsion or dispersion containing polymer particles. The polymer particles generally comprise a thermoplastic polymer, such as a polyolefin. For example, in one embodiment, the size composition contains polyethylene. The polyethylene may be a high density polyethylene, a medium density polyethylene or a low density polyethylene. In one particular embodiment, for instance, the size composition contains a mixture of high density polyethylene particles and medium density polyethylene particles.

The polymer particles may be contained in an aqueous emulsion. Thus, the size composition may contain water and one or more emulsifiers combined with the polymer particles. The emulsifier may comprise one or more surfactants. For example, in one embodiment, the size composition may contain one or more nonionic surfactants.

In one particular embodiment, the polymer particles contained within the size composition may also serve as a lubricant once applied to the yarns. Thus, the coefficient of friction of the yarns is reduced which facilitates the weaving process.

Various commercially available size compositions may be used in the process of the present disclosure. For example, in one embodiment, the size composition may contain UNI-LUBE 1513 marketed by Unichem, Inc. In another embodiment, the size composition may contain KATAMIN BW from Zschimmer & Schwarz, Inc. KATAMIN BW contains a combination of polyethylene, paraffin and emulsifiers.

Other possible size compositions that may be used include CHEMSOFT 24 marketed by Resolution Specialty Materials. CHEMSOFT 24 comprises a polyethylene wax emulsion. In still another embodiment, LANAPOL HDN-40 may be used that is marketed by Lenmar Chemical Corporation.

According to the present disclosure, the size composition can be applied only to the warp yarns or can be applied to both the warp yarns during sizing and the weft yarns at the loom or during yarn manufacturing. Once applied to the yarns, the yarns are then woven into a fabric using a water jet weaving device. After the fabric is formed, in one embodiment, the fabric may be scoured to remove the size composition. Of particular advantage, however, it has been discovered that the size composition need not be removed from the fabric. In fact, various advantages and benefits may be realized if the size composition is left on the yarns.

For instance, the size composition may serve to increase the tear strength of the fabric. For example, the size composition may be present in the fabric in order to increase the tear strength of the fabric by at least about 25% in both the warp and weft directions. For instance, the size composition may be present in order to increase the tear strength of the fabric by at least about 50%, such as at least about 75%, such as at least about 100%, or even in an amount by at least 200% in both the warp and weft directions.

The actual tear strength of the fabric may vary depending upon the fabric construction and various other factors. In one particular embodiment, for instance, the tear strength of the fabric may be greater than about 250 N in both the warp direction and the weft direction.

When added in relatively large quantities, however, the size composition may tend to slightly reduce the edge comb properties of the fabric. When added in lesser amounts, the above improvements in tear strength properties can be realized while still maintaining sufficient edge comb properties. For instance, even at a tear strength of greater than 250 N, the edge comb of the fabric can be greater than about 250 N.

In general, the size composition may be applied to the yarns so that the resulting fabric contains the size composition in an amount less than about 1% by weight. For example, the size composition may be present in the resulting fabric in an amount from about 1% by weight to about 0.001% by weight. Ultimately, the amount of size composition present on the yarns may depend upon various factors including the particular size composition, the heat and dwell time to which the fabric is exposed during heat treating, the concentration of the size composition in the size bath, the nip pressure after the size bath, and the desired results. Further, if the size composition is to be removed in a scouring process, it may be desirable to add greater amounts of the size composition.

Referring to FIG. 1, for exemplary purposes only, one process for applying the size composition of the present disclosure to a plurality of yarns in forming an air bag fabric is shown. As illustrated, one or more beams of warp yarns 10 are fed to a slasher 12 that is configured to apply the size composition to the yarns. The slasher 12 includes a dip bath 14 containing the size composition, a pair of opposing nip rolls 16, and one or more drying devices. For example, in one embodiment as shown in FIG. 1, the process can include a heated air dryer 18 in combination with a plurality of heated rollers or cans 19.

As shown, the warp yarns 10 are fed to the dip bath 14 where the size composition is applied. It should be understood, however, that the size composition may be applied to the yarns using any suitable technique. For example, in other embodiments, the size composition may be sprayed on the yarns or applied using a kiss roll or otherwise applied to the yarns. In FIG. 1, once the warp yarns have passed through the dip bath 14, the warp yarns are then directed in between a pair of nip rollers 16. The nip rollers 16 apply sufficient pressure to the yarns in order to remove any excess composition.

If desired, the warp yarns 10 exiting the nip rollers 16 may be fed to one or more drying devices for drying the size composition. In general, any suitable drying device may be used in order to dry the yarns. For example, as shown, the drying device 18 may comprise a device that contacts the yarns with heated air. Additionally, the yarns may be fed over a plurality of heated rollers or cans 19. For example, in one embodiment, the drying device 19 may contain six to eight heated cans over which the yarns travel.

Figure 2:
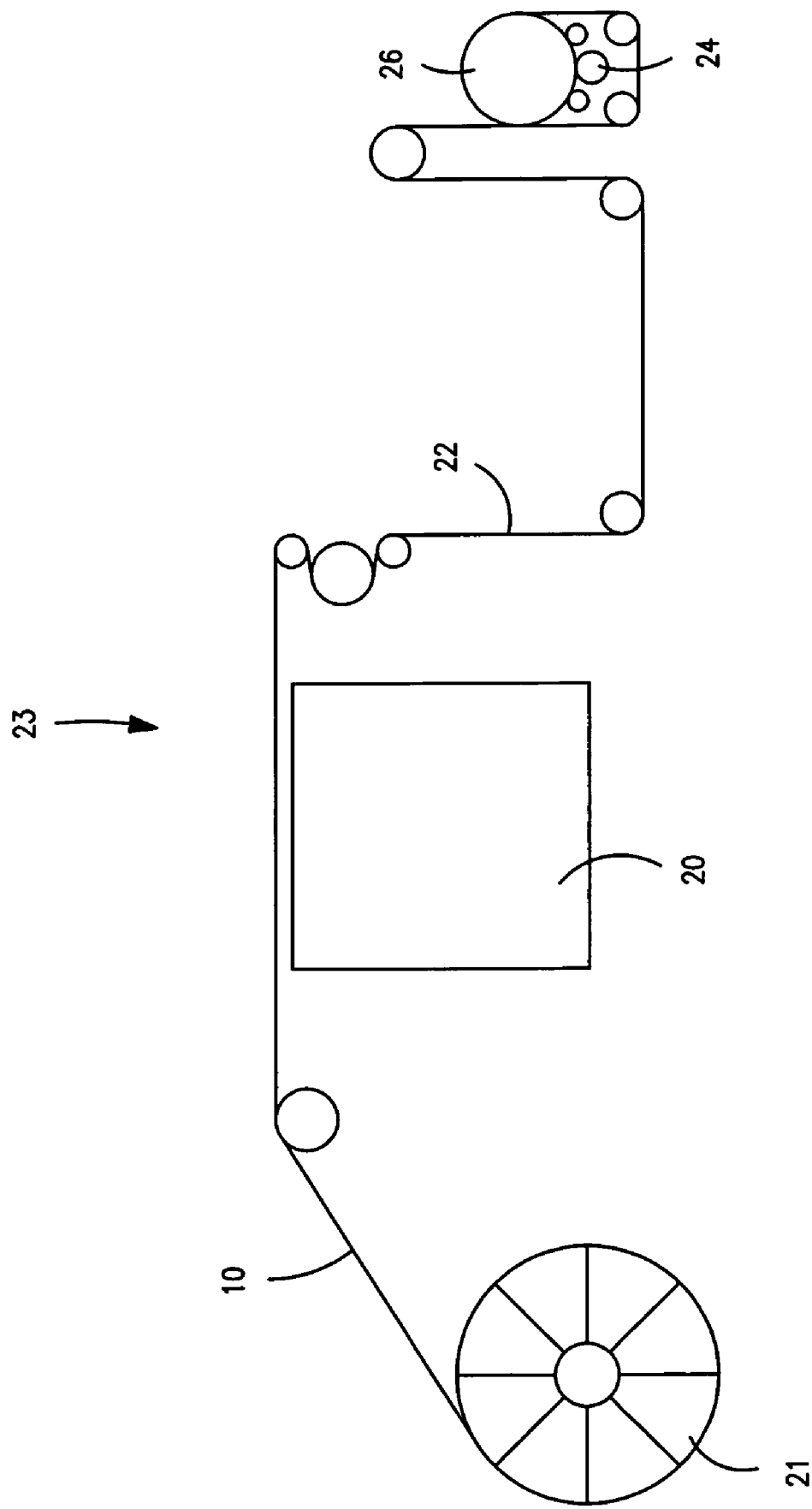
FIG. 2 is diagrammatical view of a process for producing an air bag fabric in accordance with the present disclosure.

After exiting the slasher 12, the warp yarns 10 are then wound on a take-up roll (loom beam) 21. The warp yarns are then fed into a water jet weaving process generally 23 as shown in FIG. 2. In particular, the warp yarns 10 are unwound from the roll 21 and fed to a water jet weaving device 20. The water jet weaving device 20 forms a shed from the warp yarns 10 and feeds weft yarns or picks through the shed using jet streams of water. As shown in FIG. 2, an air bag fabric 22 is produced by the water jet weaving device 20.

Once the air bag fabric 22 is produced, the fabric may optionally be exposed to a second drying device 24 in order to at least partially dry the fabric. The second drying device 24 may comprise an infrared strip heater, a heated mandrel, a drying device that subjects the fabric to heated air, or any other suitable drying device. Once the air bag fabric 22 is formed, the fabric is then, in this embodiment, wound on a take-up roll 26.

As described above, if desired although not necessary, the air bag fabric 22 may be scoured after the fabric has been formed. During scouring, the fabric is fed to a bath containing a detergent that removes the size composition and any other oils contained on the yarns. Scouring, however, is not necessary.

One of the advantages and benefits to applying the size composition of the present disclosure to the warp yarns 10 as shown in FIGS. 1 and 2 is that the runnability of the yarns can be improved. For example, applying the size composition to the yarns decreases the number of stops that occur during the weaving process. Stops in the weaving process may occur due to, for instance, yarn breakage and other similar incidents. When using the size composition of the present disclosure, the amount of stops per 100,000 picks may decrease by at least about 50%, such as at least about 100%, such as at least about 200%. For example, in one embodiment, the number of stops per 100,000 picks may decrease by at least about 500%.

For instance, in one particular embodiment, the number of stops per 100,000 picks may be less than about 5, such as less than about 4, such as less than about 2.5, such as less than about 1.5.

Once the air bag fabric 22 is formed and wound on the take-up roll 26, the fabric can then be placed on a tenter frame and fed through various finishing processes. For example, in one embodiment, the fabric may be fed through a heating device and heat set. The temperature to which the fabric is heated during this process may vary depending upon the type of yarns used to form the fabric and the desired result. In general, for instance, the fabric may be heat set/dried at a temperature of from about 200° F. to about 400° F.

The yarns used to form the air bag fabric of the present disclosure can vary depending upon the particular application. In general, the warp yarns and weft yarns may be made from natural or synthetic materials. In one embodiment, for instance, the warp yarns and weft yarns may comprise multifilament yarns made from a synthetic polymer. The polymer used to form the yarns may comprise, for instance, a polyamide polymer, a polyimide polymer, an acrylic polymer, a fluoropolymer, a polyester polymer, or a polyolefin polymer. The polyolefin polymer may comprise a polyethylene, a polypropylene, copolymers thereof and blends thereof. Particular polyesters that may be used include polyethylene terephthlate, polybutylene terephthlate, polycyclohexylene terephthlate, polycyclohexylene dimethylene terephthlate, glycol modified polyethylene terephthlate, combinations thereof, and copolymers thereof.

In one particular embodiment, the multifilament yarns are formed from a polyamide, such as polyamide 66 or polyamide 6.

In general, the yarns can have a denier of from about 210 to about 840. For instance, the yarns can have a denier of 210, 315, 420, 630, or 840.

The yarn density in the warp direction and the weft direction can vary depending upon the denier of the yarns and the desired permeability of the fabric. For instance, when using yarns having a denier of from about 210 to about 880, the yarn density in both the warp direction and the weft direction can be from about 15 yarns per inch to about 75 yarns per inch. In particular, when using a 210 denier yarn, the yarn density can be from about 50 yarns per inch to about 73 yarns per inch. When using 350 denier yarns, on the other hand, the yarn density can be from about 45 yarns per inch to about 61 yarns per inch. When using yarns having a denier of about 420, the yarn density can be from about 40 yarns per inch to about 55 yarns per inch. When using 630 denier yarns, the yarn density can be from about 35 yarns per inch to about 45 yarns per inch, and when using 840 denier yarn, the yarn density can be from about 15 yarns per inch to about 34 yarns per inch. It should be understood, however, that the above ranges are merely exemplary for some applications.

Air bag fabrics made according to the present disclosure may be used in numerous applications. For instance, the fabric may be used to construct driver-side air bags, passenger-side air bags, side-curtain air bags, and the like.

Figure 3:
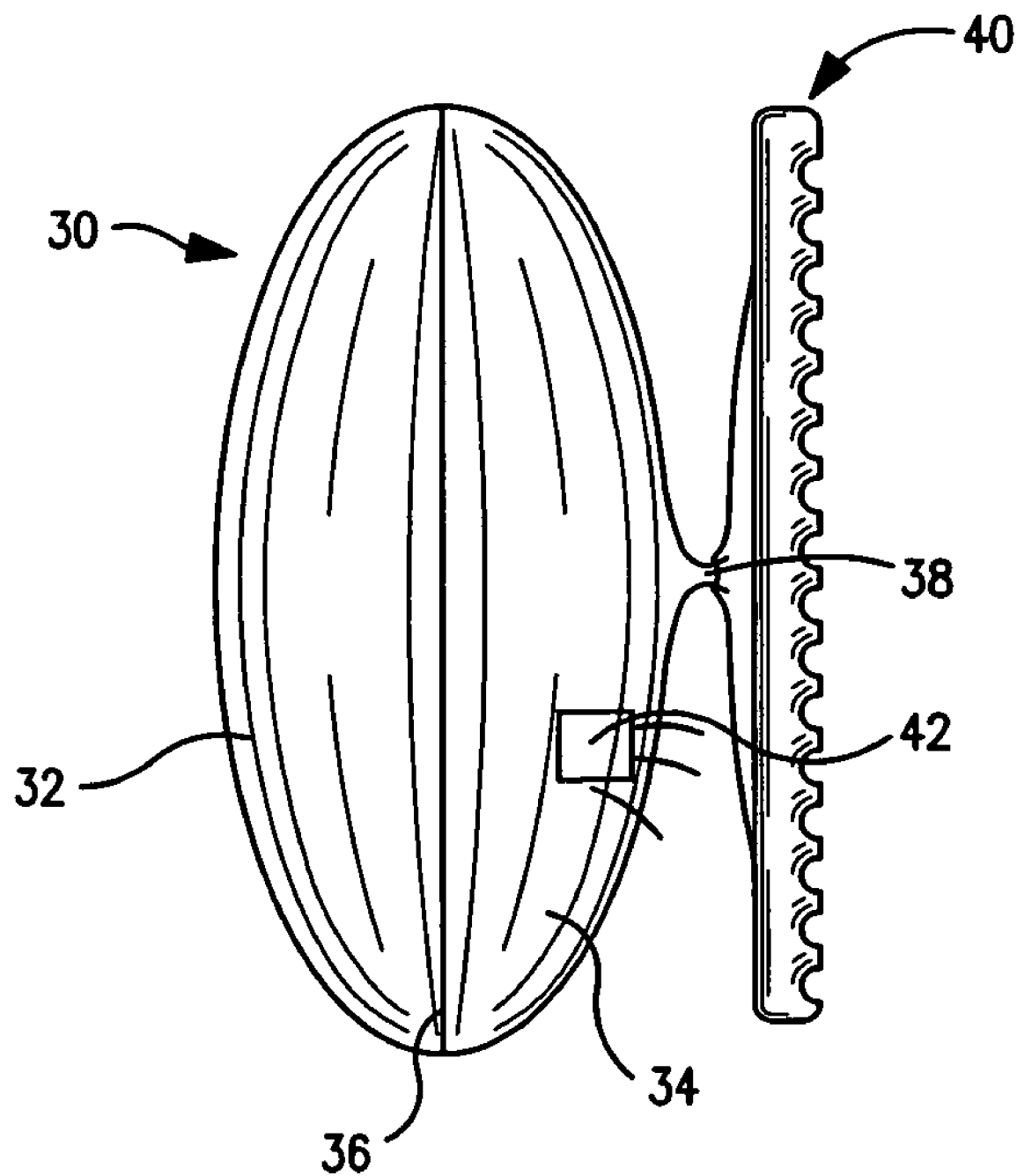
FIG. 3 is a side view of an inflated driver-side air bag made in accordance with the present disclosure.

Referring to FIG. 3, for instance, an exemplary driver-side air bag generally 30 is illustrated. The air bag 30 includes a front panel 32 attached to a back panel 34 along a seam 36. The back panel 34 defines a passage 38 through which the inflation gas is passed. As shown, the driver-side air bag 30 is integrated into a steering column 40.

As described above, air bags, such as air bag 30, should be constructed so as to be capable of withstanding the force of the inflation gas and also impact with a driver or passenger. The air bag should also be configured to deflate or "leak down" after impact with a driver or passenger. In this regard, the air bag 30 can also include a vent 42 that expels the inflation gas so that the air bag will deflate when impacted.

When constructing the air bag 30 from an air bag fabric made in accordance with the present disclosure, the air bag fabric may be used without any further coatings or treatment (i.e. used as an uncoated fabric). Alternatively, the air bag fabric may be coated with an elastomeric resin so as to make the fabric practically impermeable to gases. The elastomeric resin may comprise, for instance, a silicone, an acrylic polymer, a urethane, or the like.

In the embodiment illustrated in FIG. 3, the air bag 30 includes a front panel 32 and a back panel 34. If desired, the air bag 30 may include side panels as well. For instance, the air bag may be gusseted to include a side wall positioned in between the front panel 32 and the back panel 34.

The seam 36 as shown in FIG. 3 can be situated outward on the air bag 30 or can be inverted to be facing inside of the air bag. The seam 36 can join the front panel 32 to the back panel 34 by any known method in the art, such as by hotmelting, stitching, sewing, sonic or radio frequency welding, thermal bonding, mixtures thereof, and the like.

Referring to FIG. 4, one embodiment of a passenger-side air bag generally 50 made from the air bag fabric of the present disclosure is illustrated. As shown, the passenger-side air bag 50 deploys from a dashboard 52 within the passenger compartment of a vehicle. As shown, the passenger-side air bag 50 includes a front panel 54 and two side panels 56 and 58, joined at seams 60 and 62. If desired, the air bag 50 can include one or more vents 64 as shown in FIG. 4. The one or more vents allow the air bag 50 to quickly deflate after impact. In particular, the vents can be utilized in the air bags to help control the deflation of the air bags as it is impacted by the vehicle occupant. As a result, adequate support can be provided to the vehicle occupant without excessive rebounding. Deflation of the air bag also facilitates the ability of a passenger to exit the vehicle once the air bag has deployed. The vents can be located anywhere on the air bag and can have any suitable size and shape depending upon various factors.

In addition to driver-side and passenger-side air bags, many vehicles are now including other air bag systems to further protect occupants. For instance, many vehicles are now being equipped with side-cushion air bags and/or side-curtain air bags. A side-cushion air bag can typically be mounted in the outboard of a seat within the vehicle. A side-curtain air bag, on the other hand, can be mounted along the roof rail of the vehicle and can be designed to deploy downward to protect the passengers from the side wall of the vehicle and the side windows of the vehicle.

Referring to FIGS. 5 and 6, one embodiment of a side-curtain air bag 70 made in accordance with the present disclosure is shown. In FIG. 5, for instance, the side-curtain air bag 70 is shown deployed within a passenger compartment 72 of a vehicle 74. The vehicle 74 is shown to have a seat 76 with a headrest 78 configured to receive a passenger. As illustrated, the air bag 70 is deployed in a manner that protects an occupant of the vehicle from head injury caused by impact of the occupant's head and the side of the vehicle 74. In this embodiment, the side-curtain air bag 70 is shown deployed from an upper corner rail 80 of the vehicle 74.

In FIG. 6, an isolated view of the side-curtain air bag 70 is shown. As illustrated, the air bag 70 includes an opening 82 that allows inflation gas to enter the air bag during deployment. As shown, the air bag 70 is made from an air bag fabric 84 in accordance with the present disclosure. The air bag fabric 84 may be coated or uncoated.

In contrast to driver-side and passenger-side air bags, some side-cushion and side-curtain air bags should remain inflated for relatively long periods, such as several seconds, for continuous protection of the vehicle occupant should the vehicle roll over or continue to receive additional impacts. As such, the air bag 70 as shown in FIG. 5 does not include any vents. It should be understood, however, that vents may be included as desired.

The present disclosure may be better understood with reference to the following example.

EXAMPLE

In the following example, an air bag fabric was produced in accordance with the present disclosure. In particular, the air bag fabric was made from warp yarns that have been treated with a size composition. After the fabric was produced, the size composition was not removed from the warp yarns but instead remained incorporated into the fabric. The air bag fabric was then subjected to various tests and compared to a similar air bag fabric that did not contain the size composition.

In order to produce the air bag fabric, beams of multifilament Nylon 6,6 warp yarns, obtained from Invista, were fed to a slasher that was configured to apply a size composition to the yarns. The size composition applied to the warp yarns comprised an aqueous bath containing UNILUBE 1513 obtained from Unichem, Inc. of Haw River, N.C. The size composition contained high and medium density polyethylene in conjunction with a surfactant. UNILUBE 1513 is a substantially nonionic emulsion having a pH of 9.5.

The warp yarns had a denier of 630. As shown in FIG. 1, the warp yarns were fed to the dip bath where the size composition was applied. As stated above, the solids content of the size composition was varied during the example to produce different samples. In particular, different samples were produced in which the solids content of the bath was 6.67%, 1.67%, 0.4%, 0.2%, and 0.1% respectively. Once the warp yarns were passed through the dip bath, they were directed in between a pair of nip rollers to remove any excess size composition. The warp yarns exiting the nip rollers were then dried.

After exiting the slasher, the warp yarns were then fed to a water jet weaving device. The water jet weaving device forms a shed from the warp yarns and feeds weft yarns or picks through the shed using jet streams of water. The air bag fabric formed on the water jet weaving device had a yarn density of approximately 40×40 yarns per inch.

Once the air bag fabric was formed, it was wound on a take-up roll. From the takeup roll, the fabric was transferred to a tenter frame and heat set/dried at a temperature range of about 175° F. to 400° F.

Various tests were then performed on the air bag fabric samples containing the size composition. The same tests were also performed on a similar air bag fabric that was not treated and did not contain the size composition. Specifically, the following are standard test methods that were used to test the tensile strength, the tear strength, the edgecomb resistance, the air permeability, the weight, the amount of size composition on the fabric, and the runnability. To test the tensile strength, the Ravel Strip method—EASC 9904 018 0/DIN EN ISO 13934-1/ISO 5081 was used. To test the tear strength, the Tongue Method ISO 13937-2 date Apr. 1, 2000 was used. The edgecomb resistance is a measure of how well a woven fabric resists yarn slippage. This test is intended to simulate seam deformation under stress. To test the edgecomb resistance, test method ASTM D 6479 date Apr. 10, 2002 was used. To test the air permeability, test method ISO 9237 date Jun. 15, 1995 was used. To test the weight, test method ISO 3801 date Feb. 15, 1983 was used.

Results from these tests are displayed below in Table 1. The control values are an average of air bag fabric samples that did not contain any size composition. Samples 1 and 2 were tested multiple times.

As shown above, the size composition of the present disclosure significantly increased the tear strength of the air bag fabric in comparison to the control.

Another important characteristic is the runnability of the fabric. The runnability is measured by how many machine stops occur per 100,000 picks during fabric weaving. The runnability of air bag fabrics made in accordance with the present disclosure in comparison to a control containing no size composition are shown below in Table 2.

TABLE 2

| | Runnability | | | | | |
|---|---|---|---|---|---|---|
| | Control | Sample 1 | Sample 2 | Sample 3 | Sample 4 | Sample 5 |
| % Solids of Size Composition | | 6.67% | 1.67% | 0.4% | 0.2% | 0.1% |
| Runnability (Stops/100,000 picks) | 6.43 | 2.13 | 0.9 | 3.52 | 1.36 | 1.51 |

As shown above, when the size composition was applied to the warp yarns, the amount of stops dramatically decreased.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. An air bag material comprising:
   a water jet woven fabric comprising warp yarns and weft yarns, the warp yarns and weft yarns comprising multifilament synthetic yarns, the warp yarns containing a size composition, the size composition comprising an emulsion containing polyolefin particles and a surfactant, and wherein the woven fabric is not scoured after being formed.

TABLE 1

| Fabric Characteristics | | | | | | | | | |
|---|---|---|---|---|---|---|---|---|---|
| Characteristic | Control | Sample 1 | | Sample 2 | | Sample 3 | Sample 4 | Sample 5 |
| % Solids of Site Composition | | 6.67% | | 1.67% | | 0.4% | 0.2% | 0.1% |
| Tensile Strength Warp (N) | 4110 | 4151 | 4302 | 4049 | 4280 | 4217 | 4293 | 4011 | 4150 |
| Tensile Strength Weft (N) | 4149 | 3918 | 3917 | 3820 | 4285 | 4217 | 4277 | 4440 | 4659 |
| Tear Strength Warp (N) | 231 | 544 | 484.9 | 503 | 470.5 | 479 | 405 | 416.9 | 311 |
| Tear Strength Weft (N) | 234 | 623 | 562.9 | 512 | 537 | 521 | 438 | 438.3 | 337 |
| Edge Comb Warp (N) | 450 | 154 | 661 | 145 | 177 | 197 | 305 | 304 | 438 |
| Edge Comb Weft (N) | 373 | 167 | 481 | 179 | 184 | 189 | 274 | 271 | 336 |
| Air Permeability (l/min) | 7.2 l | 7.8 | 6.6 | 7.3 | 8.1 | 7.9 | 8.2 | 8.6 | 5.6 |
| Weight (g/m$^2$) | 240.3 | 240 | 249 | 235 | 235 | 236 | 238 | 236 | 248 |
| % Size on Fabric | 0 | 1.28 | 1.33 | 0.31 | 0.31 | 0.31 | 0.08 | 0.04 | 0.02 |

2. An air bag material as defined in claim 1, wherein the size composition is present in an amount sufficient to increase the tear strength of the fabric by at least about 50% in both the warp and weft directions.

3. An air bag material as defined in claim 1, wherein the size composition is present in an amount sufficient to increase the tear strength of the fabric by at least about 100% in both the warp and weft directions.

4. An air bag material as defined in claim 1, wherein the water jet woven fabric has a basis weight of from about 150 gsm to about 400 gsm and wherein the water jet woven fabric has a yarn density in both the warp direction and the weft direction in an amount from about 10 yarns per inch to about 80 yarns per inch.

5. An air bag material as defined in claim 1, wherein the multifilament yarns are made from a material comprising a polyamide.

6. An air bag material as defined in claim 1, wherein the polyolefin particles comprise polyethylene.

7. An air bag material as defined in claim 1, wherein the emulsion further contains a paraffin.

8. An air bag material comprising:
a water jet woven fabric comprising warp yarns and weft yarns, the warp yarns and weft yarns comprising multifilament polyamide yarns, the yarns containing a size composition comprising polyethylene particles and a surfactant, the size composition being present on the fabric in an amount sufficient to increase the tear strength of the fabric by at least about 25% in a warp direction and in a weft direction, the multifilament yarns having a denier of from about 210 to about 840 and the water jet woven fabric having a yarn density in both the warp direction and the weft direction in an amount from about 25 yarns per inch to about 75 yarns per inch.

* * * * *

UNITED STATES PATENT AND TRADEMARK OFFICE
CERTIFICATE OF CORRECTION

PATENT NO. : 7,581,568 B2 Page 1 of 1
APPLICATION NO. : 11/349052
DATED : September 1, 2009
INVENTOR(S) : Scott Manley It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 878 days.

Signed and Sealed this

Fourteenth Day of September, 2010

David J. Kappos
*Director of the United States Patent and Trademark Office*